T. AND J. R. RAY.
VACUUM APPARATUS.
APPLICATION FILED DEC. 3, 1917.
1,428,557.
Patented Sept. 12, 1922.
3 SHEETS—SHEET 2.
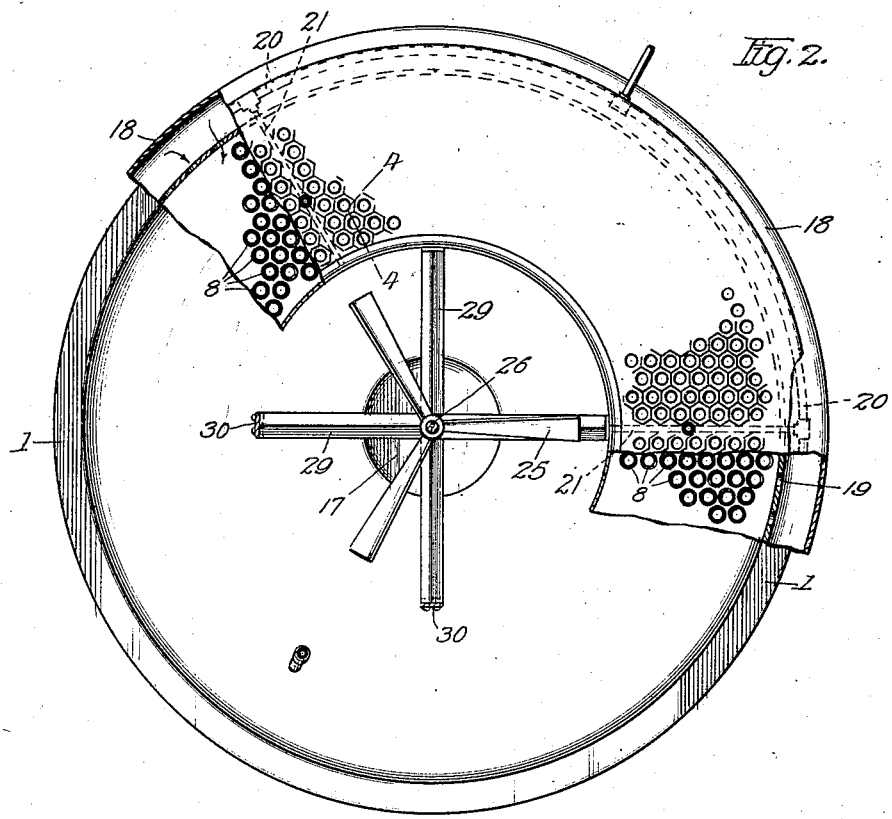
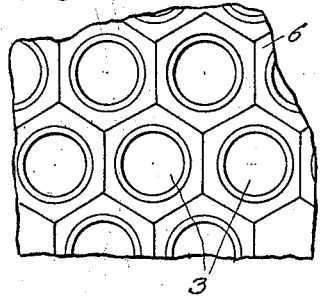
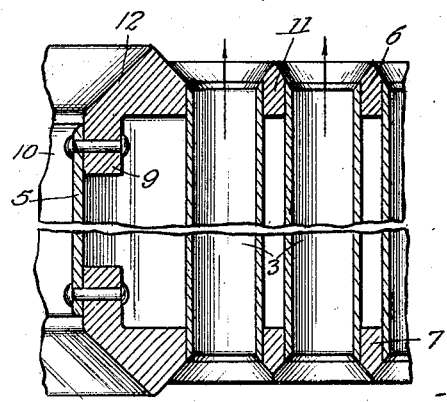
Witnesses:
Inventors:
Thomas Ray
Joshua R. Ray Patented Sept. 12, 1922.

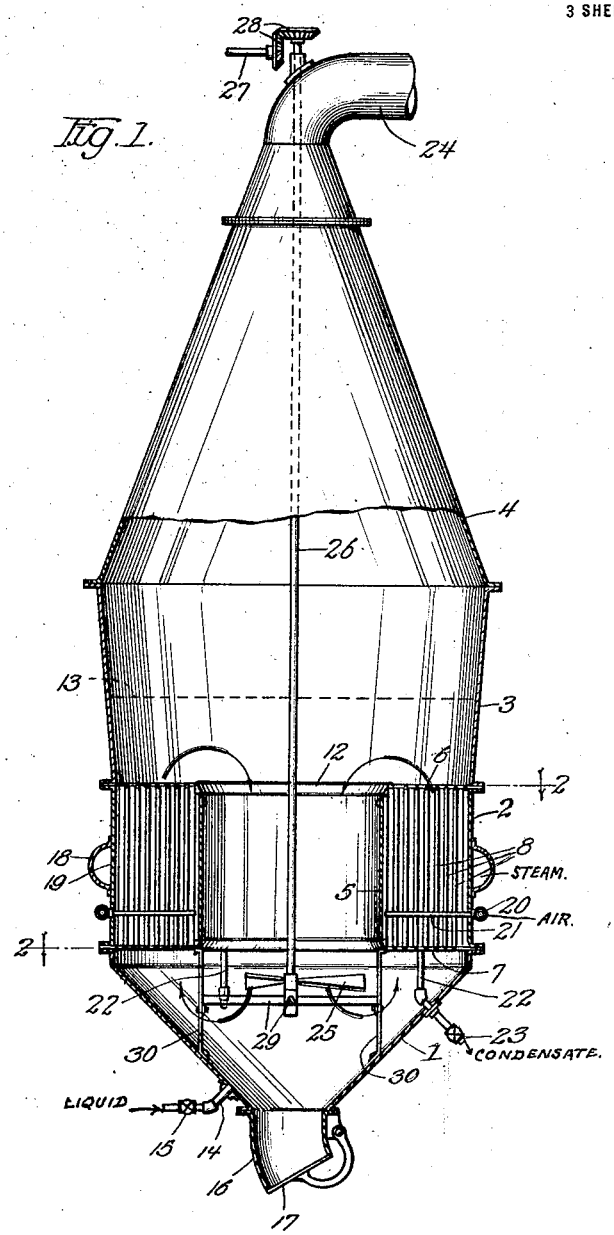

1,428,557

UNITED STATES PATENT OFFICE.

THOMAS RAY AND JOSHUA R. RAY, OF MANISTEE, MICHIGAN, ASSIGNOR TO RAY BROS. CORPORATION, OF NEW YORK, N. Y., A CORPORATION OF NEW YORK.

VACUUM APPARATUS.

Application filed December 3, 1917. Serial No. 205,245.

*To all whom it may concern:*

Be it known that we, THOMAS RAY and JOSHUA R. RAY, residing at Manistee, in the county of Manistee and State of Michigan, have jointly invented certain new and useful Improvements in Vacuum Apparatus, of which the following is a description.

Our invention belongs to that general class of apparatus known as vacuum apparatus and more especially evaporating pans to be employed in the manufacture of sugar or the like. The invention has among its other objects the production of apparatus of the kind described that is simple, efficient, durable and satisfactory for use wherever found applicable. More particularly it has among its objects the production of a device of the kind described provided with a tube plate so arranged that the same will satisfactorily drain and not permit the accumulation and burning of the juices on the top of the plate. It has as an object the production of apparatus in which the juices may circulate without the forming of eddies. Heretofore in apparatus of this kind there has been a tendency for the juices to be burned and the product be thereby injured to a more or less extent. In addition, the accumulated juices have a tendency to burn and cake on the plate, thereby affecting the efficiency of the device.

Many other objects and advantages in the construction herein shown and described will be obvious to those skilled in the art from the disclosure herein given.

To this end our invention consists in the novel construction, arrangement and combination of parts herein shown and described, and more particularly pointed out in the claims.

In the drawings, wherein like reference characters indicate like or corresponding parts, Figure 1 is a sectional view of the preferred form of my device;

Figure 2 is a cross-sectional view of the same, taken substantially on line 2—2 in Figure 1, showing a top elevation of a portion of the top tube plate, a portion of a section through the tubes, and a portion below;

Figure 3 is an enlarged view of a portion of the upper tube plate;

Figure 4 is a sectional view through a portion of the tube plate and tubes, substantially as shown in Figure 1;

Figure 5:
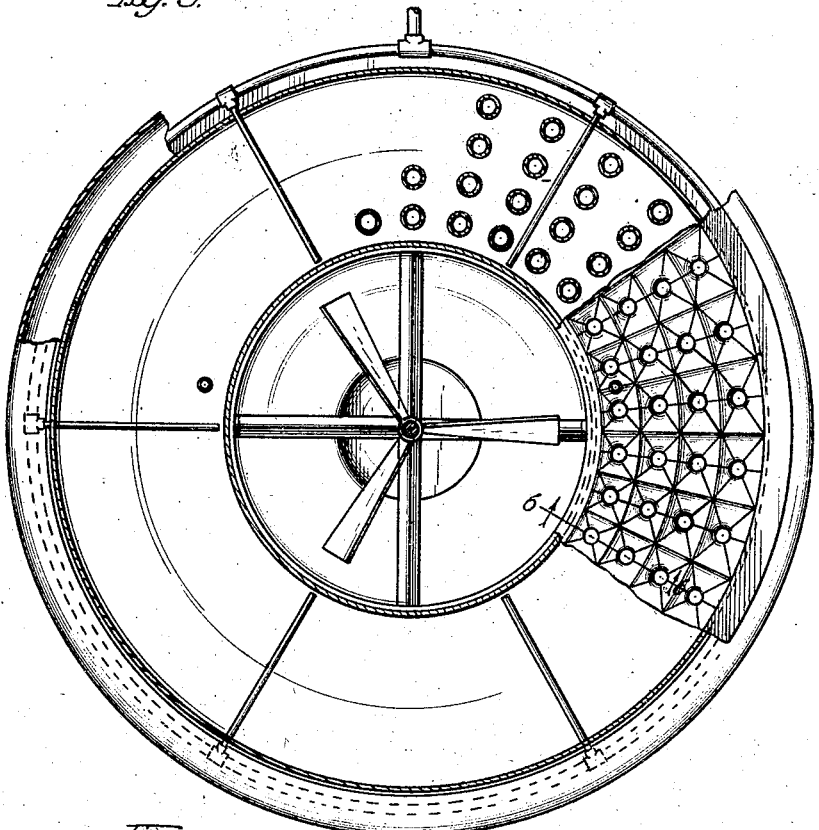
Figure 5 is a view similar to Figure 2, showing a modified construction.

Referring particularly first to Figure 1, 1 represents a shell preferably hopper-shaped which carries the shell part 2, above which is mounted the shell 3, carrying the top shell part 4. Arranged within shell 2 is an inner shell or drum part 5, the space between the shells or drums 2 and 5 being enclosed by the plates 6 and 7 which are, however, connected by the tubes 8.

The plate 6 may be termed the upper tube plate and, as most clearly shown in Figure 4, the same is preferably formed with a flange 9 to which the drum or shell 5 may be secured by means of rivets 10, or their equivalents, the lower plate being similarly secured. The plates 6 and 7 are provided with the desired number of openings through the same which, in the preferred construction, are arranged at equal distances apart and regularly spaced as most clearly shown in Figure 2. It may be mentioned that the tube plates in the preferred construction are made in the desired number of sections and suitably secured together so that there is no leakage at their juncture. The tubes project into the openings in the plates, as shown in Figure 4, but preferably terminate below the outer faces of the plates, the plates being cut away or beveled as at 11, that is, counter-sunk, so that there are no flat surfaces at the top of the top plate or bottom of the bottom plate. This causes the juices to be drained into or pass out of the tubes which are also preferably inwardly beveled, as shown in the figure referred to. We preferably form the other edges as at 12, or in an equivalent manner, so that the proper drainage or flow is provided both in the inside as well as into the adjacent tubes. The lower plate 7 is constructed as described on plate 6. By making the lower tube similar to the upper tube the circulation is aided as the inclined surfaces will assist the liquid in entering the tubes in a solid body and not form eddies as the ordinary flat tube plate will. The inclined top tube plate will also assist the circulation by letting the liquid escape from the top of the tubes without any accumulations as in the case of the flat tube sheet which causes accumulations and eddies as the liquid leaves the top of the tube. The shell 2, shell 5 and plates 6 and 7 constitute the steam or heating drum.

The locations of the openings are determined by striking lines parallel with one of the diameters of the plate, then lines parallel with another diameter extending at 120 degrees thereto. The plate openings are in effect counter-sunk about the top, it being understood that the plate may be cast that way. The flared portion at the top is of such diameter that the inclined walls intersect at all points with the adjacent walls of the next opening so that only the sharp edges are produced at the top. In effect the plate is really one having a great many small faces, all of which are inclined so that the liquid or juices will drain properly and not remain on the top of the plate as would be the case where the holes were straight and not flared or counter-sunk, so that there were flat spaces between the holes. Obviously the flared plate 7 may be laid out in the same way so that the holes register for the tubes.

In constructing the apparatus the plates 6 and 7, inner shell 5 and tubes are arranged substantially as shown in Figure 1. We provide a feed pipe 14 and valve 15 through which the juices or liquid to be concentrated may be admitted to the apparatus, and we also provide a discharge chute part or spout 16, which is provided with a valve or gate 17 arranged to be controlled in any suitable manner. It will be noted by referring to Figures 1 and 2 that shell 2 is provided with a part 18 which constitutes a steam manifold, this being in communication by means of the openings 19 with the interior of the steam drum between the plates and shells. Steam admitted to the manifold is admitted to and circulates around the tubes and thoroughly heats the same as well as the upper and lower plates and shell 5. An air relief pipe 20 is also provided which has the desired number of air pipes 21 preferably projecting to the interior of the drum so that the air may be permitted to escape and permit the steam to enter, that is, the device will not air-lock.

One or more drain pipes 22, which may be controlled by valves 23 are also provided so that any water of condensation may be drawn from the drum at such times as may be desired. The part 4 is provided with an outlet 24 through which the vapors may escape. Part 4 may be and is ordinarily connected to a condenser. We have shown an agitator 25 arranged to be driven by shaft 26 and the gears 28—28 and shaft 27, it being understood that any equivalent agitating device may be employed for the purpose. In some cases with some liquids the agitator is not desired in which case the same may be omitted. As shown, the lower end of shaft 26 is supported from the cross parts or spider 29 carried by the uprights 30, the parts 29, however, being formed, as most clearly shown in Figures 1 and 2, with a sharp upper edge, so that there can be no accumulation or settling of the contents on the same, but on the contrary, the same will drain off.

In use the juices are fed into the apparatus through the feed pipe 14 until they are ordinarily to the point indicated by the level line 13, which may vary according to conditions. Steam is admitted into the manifold 18 and the same passes through openings 19 into the heating drum and about the tubes. The steam thoroughly heats the contents of the apparatus, the liquids or juices circulating upward through the tubes 8 and downward through the center. While the heat causes a circulation the agitator causes the juices to travel down through the center so that the same is always in circulation and is not burned at any time. As the juices become heavier or more concentrated they naturally do not flow quite as easily, but owing to the peculiar formation of the top plate 6 there is no tendency for the same to accumulate, and consequently, burn and cake on the plate. On the contrary, they drain into the tubes and the plate is substantially always free from accumulated concentrated juices. When the batch has been concentrated to the desired extent the trap or valve 17 may be opened and the contents of the apparatus drawn off and taken to where desired for further treatment. Obviously when the pan is emptied of the concentrated mass, or juices, or liquids, which is done (after the circulation is stopped and steam shut off) by opening the valve in the bottom of the pan, the whole mass settles down slowly both through the tubes and larger down flow tube. At this time in the ordinary apparatus there is danger of the crystals, for example in sugar, sticking in the tube plate when made flat. By our design all the crystals and liquid drain out and leave the tube plates and pan clean.

Figures 6, 7:
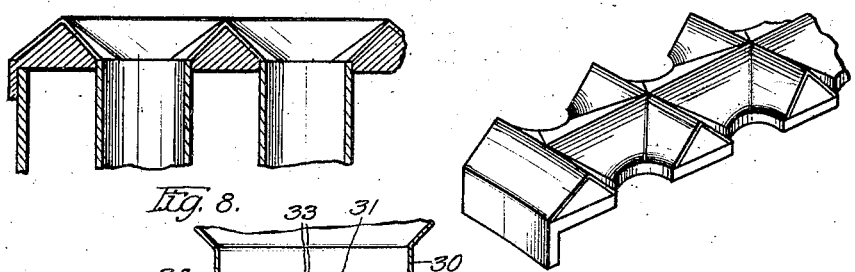
Figure 6 is a view similar to Figure 4 and taken substantially on line 6—6 of Figure 5.
Figure 7 is a perspective view of a portion of the plate shown in Figures 5 and 6.

In the construction shown in Figures 5, 6 and 7, the openings through the top plate are arranged differently, that is to say, they are regularly spaced but are not equally distant from each other owing to the fact that they are arranged on intersecting radial and circumferential lines. However, in this case the top of the plates consist of a plurality of inclined faces so that the liquids or juices at all times drain into tubes. Obviously, however, there are less openings and tubes than the construction illustrated in Figure 2. The bottom tube plate may be the same design as the top tube plate.

Figure 8:
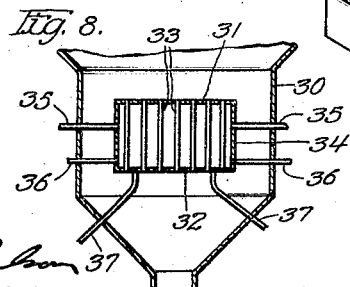
Figure 8 is a detail view illustrating a slightly modified form of drum.

In the construction shown in Figure 8, 30 represents the side walls of the pan and 31—32 tube plates connected by the drum 34. The steam is admitted to the drum through the pipes 35, 36 being the air pipe. In this case the plates 31 and 32 are made with inclined faces similar to the other construction and with the same results.

Having thus described our invention it is obvious that various immaterial modifications may be made in the same within the scope of the appended claims without departing from the spirit of the invention, hence we do not wish to be understood as limiting ourselves to the exact form, construction, arrangement and combination of parts herein shown and described or uses mentioned.

What we claim as new and desire to secure by Letters Patent is:—

1. In an apparatus of the kind described, and in combination, a heating drum provided with end plates, each having a series of openings therein, the peripheral outer edge of each opening being inclined, and tubes connecting said plates terminating within the openings of the plates below the inclined portions thereof, the outer ends of said tubes being bevelled in keeping with the inclined portions of the openings.

2. In an apparatus of the kind described, and in combination, a heating drum, a plate secured to each end of the heating drum, each of said plates having a central opening and a plurality of openings there around, the peripheral edge about each of the last mentioned openings being inclined from the outer face towards the inner face, a ridge formed around the central opening, said ridge being bevelled on each side from the top, and tubes received between the plates with their ends received in the openings around the central opening.

3. In an apparatus of the kind described, and in combination, a heating drum, a plate for each end of the drum, each of said plates having a central opening with an inwardly extending flange therearound and a plurality of openings surrounding the central opening, the peripheral edge about each of the last-mentioned openings being inclined from the outer face towards the inner face, means passing through the inwardly extending flanges of the plates for securing them to the drum, a ridge formed around the central opening of each plate on the outer face thereof, said ridge being bevelled on each side from the top, and tubes received between the plates with their ends received in the openings around the central opening.

4. In an apparatus of the kind described, and in combination, a heating drum having a central opening therethrough, a plate secured to each end of the heating drum, each of said plates having a central opening communicating with the central opening through the drum, and a plurality of openings between the outer periphery and the central opening, the peripheral edge about each of the last-mentioned openings being inclined from the outer face toward the inner face, a ridge formed around the central opening, said ridge having one face inclined from the top towards the central opening and the other side inclined towards the openings surrounding the central opening, and tubes received between the plates with their ends received in the openings around the central opening.

5. In an apparatus of the kind described, and in combination, a heating drum, a plate secured to each end of the heating drum, each of said plates having a central opening and a plurality of openings therearound, the peripheral edge about each of the last-mentioned openings being inclined and the outer edge of each inclined portion intersecting at all points about the same with the incline of the adjacent opening, a ridge formed around the central opening, said ridge being bevelled on each side and the outer beveled side leading to the inclined edges of the openings around the center opening adjacent the ridge, and tubes received between the plates with their ends in the openings around the center opening.

In testimony whereof, we have hereunto signed our names in the presence of two subscribing witnesses.

THOMAS RAY.
JOSHUA R. RAY.

Witnesses:
CLARA BENSON,
J. C. ANDERSEN.